United States Patent [19]

Gold

[11] 3,917,840

[45] Nov. 4, 1975

[54] COMPOSITIONS AND METHODS FOR TREATING PARKINSONISM
[75] Inventor: Elijah H. Gold, West Orange, N.J.
[73] Assignee: Schering Corporation, Kenilworth, N.J.
[22] Filed: Mar. 7, 1974
[21] Appl. No.: 449,138

Related U.S. Application Data
[62] Division of Ser. No. 90,474, Nov. 17, 1970, Pat. No. 3,810,884.

[52] U.S. Cl. ................ 424/267; 424/244; 424/274
[51] Int. Cl.² ..................... A61K 9/22; A61K 31/33; A61K 31/445
[58] Field of Search.................... 424/244, 267, 274

[56] References Cited
UNITED STATES PATENTS
3,532,748   10/1970   Smith .............................. 260/239 B Primary Examiner—Stanley J. Friedman
Attorney, Agent, or Firm—Bruce M. Eisen; Stephen B. Coan

[57] ABSTRACT

Disclosed herein are substituted 1-(1-adamantyl)-2-carboxy-azacyclic compounds and certain derivatives thereof. Their compositions are particularly useful in the treatment of parkinsonism.

12 Claims, No Drawings

COMPOSITIONS AND METHODS FOR TREATING PARKINSONISM

This is a division of application Ser. No. 090,474, filed Nov. 17, 1970, now U.S. Pat. No. 3,810,884.

This invention relates to compositions of matter which may be considered chemically as substituted 1-(1-adamantyl)-2-carboxy-azacyclic compounds and to processes for making and using said compositions.

The invention sought to be patented in one of its composition of matter aspects may be described as a chemical compound having the molecular structure of an aliphatic azacyclic ring containing only carbon atoms and one nitrogen atom in which said nitrogen atom is substituted with an adamantyl radical and one ring carbon atom adjacent to said nitrogen atom, is substitued with a carboxy function. These compounds may have substituents in other positions in the azacyclic nucleus. Also included are the pharmaceutically acceptable acid addition salts of these compounds.

The invention sought to be patented in its process aspect comprises treating symptoms of parkinsonism by administering to a mammal exhibiting parkinsonism a therapeutically effective quantity of a composition of this invention.

A more specific representation of this composition of matter aspect of this invention are chemical compositions which may be represented by the structural formula:

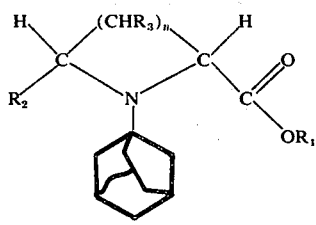

(I)

wherein $R_1$ is hydrogen, alkyl (preferably lower alkyl) or a pharmaceutically acceptable cation; $R_2$ is hydrogen or alkyl (preferably lower alkly); $n$ is an integer from 0 to 5, preferably, 1 and 3; each $R_3$ is a member independently selected from the group consisting of hydrogen, alkyl (preferably lower alkyl) and —$OR_6$ wherein $R_6$ is alkanoyl (preferably lower alkanoyl), hydrogen or alkyl (preferably lower alkyl), with the proviso that vicinal $R_3$ groups may not both be —$OR_6$, and the pharmaceutically acceptable addition salts thereof.

In those instances wherein $n$ is zero, it will be understood to represent a saturated bond connecting the $R_2$-substituted carbon atom with the carboxy-substituted carbon atom, thereby forming a three membered ring.

The "lower alkyl" radicals as used herein may be straight or branched chain and may include, for example, methyl, ethyl, n-propyl, n-butyl, n-hexyl and the like. The lower alkyl may also include those cyclized radicals having 3 to 6 carbon atoms, such as cyclopropyl and cyclohexyl. The lower alkyl radicals may be substituted, for example, with a hydroxy group. The lower alkoxy radicals as used herein include those lower alkyl radicals as hereinabove defined attached to the azetidine moiety through an oxygen atom. "Lower alkanoyl" as used herein includes those radicals having as their carbon substituent 1 to 6 carbon atoms, such as for example, acetyl, isopropionyl, butyryl and caproyl.

Exemplary of the pharmaceutically acceptable acid addition salts are those formed with maleic, fumaric, succinic, tartaric, citric, malic, cinnamic, sulfonic, hydrochloric, hydrobromic, sulfuric, phosphoric, and nitric acids. These salts may be prepared in the conventional manner by treating a solution or suspension of the free base in an organic solvent with the desired acid, and then recovering the salt which forms by crystallization techniques.

The term "pharmaceutically acceptable cation" includes any cation which forms salts of substituted 2-carboxy-azacyclic compounds which do not create any difference in kind of pharmaceutical activity from that shown by the corresponding free acid. Such cations may be used to provide greater solubility or greater ease in formulation than the corresponding free acid. Representative of such salts are those wherein the cation is an alkali metal such as sodium or potassium, ammonium, substituted ammonium such as diethanolammonium or such metal cations as calcium or aluminum.

The azacyclic nucleus may additionally contain at least one unsaturated position in those instances wherein $n$ is greater than 1. Exemplifying the unsaturated ring systems would be pyrrolinyl, 2H-pyrrolyl, 1-azacyclohepten-3,4-ol and the like.

The compositions of Formula I include optical isomers and in those instances wherein $R_2$ and $R_3$ are other than hydrogen, they may also include cis and trans geometric isomers.

For convenience, when the 1-adamantyl radical is to be represented graphically it will be represented by the symbol "-Ad".

Generally the compounds of this invention (I) are prepared by condensing an adamantyl amine (II) with a substituted $\alpha,\omega$-dihalogeno-carboxylic acid derivative (III). The foregoing general reaction scheme may be depicted as follows:

REACTION SCHEME 1

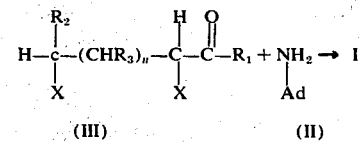

wherein Ad, $R_1$, $R_2$, $R_3$ and n are as previously defined and X is a member selected from the group consisting of chloro, bromo and iodo. This reaction is generally conducted in the presence of an acid acceptor, e.g. sodium bicarbonate, in a non-reactive organic solvent such as toluene, xylene or acetonitrile, and allowed to react at elevated temperatures up to about the reflux temperature of the reaction mixture.

For the preparation of the free acid it is preferable to employ reactant III with $R_1$ as an ester, i.e. preferably the methyl or ethyl ester, and then subsequently hydrolyzing the ester to the free acid with a suitable agent such as barium hydroxide. Furthermore, the free acid may be prepared by the condensation of an adamantyl amine with a substituted $\alpha,\omega$-dihalogeno-benzylcarboxylate. The product of the condensation is subjected to hydrogenolysis using agents such as palladium on carbon thereby cleaving the benzyl moiety giving the free acid.

Reaction Scheme II depicts the preparation of the compounds of Formula I by reacting an adamantyl halide (IV) with a 1-unsubstituted-2-carboxy azacylcic compound (V).

REACTION SCHEME II

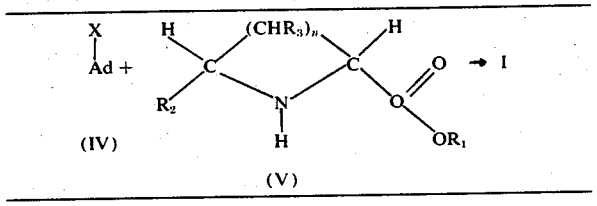

(IV)   (V)

wherein $R_1$, $R_2$, $R_3$, n and X are as previously defined.

The reaction may be carried out with or without a non-reactive organic solvent such as xylene, dimethylformide and acetonitrile at elevated temperatures thereby yielding the desired 1-(1-adamantyl)-2-carboxyazacyclic compound (I).

The compositions of this invention may also be prepared by other processes well-known to the art. The following examples are illustrative of alternate processes for the preparation of compounds of Formula I.

Reaction Scheme III depicts the preparation of compounds of the invention by contacting an α-halolactone (VI) with adamantyl amine (II) yielding an α-adamantyl aminolactone (VII) which is cleaved yielding an α-adamantylamino-ω-halo-carboxylic acid derivative (VIII) which then undergoes ring closure giving the free carboxylic acid derivative (Ia).

REACTION SCHEME III

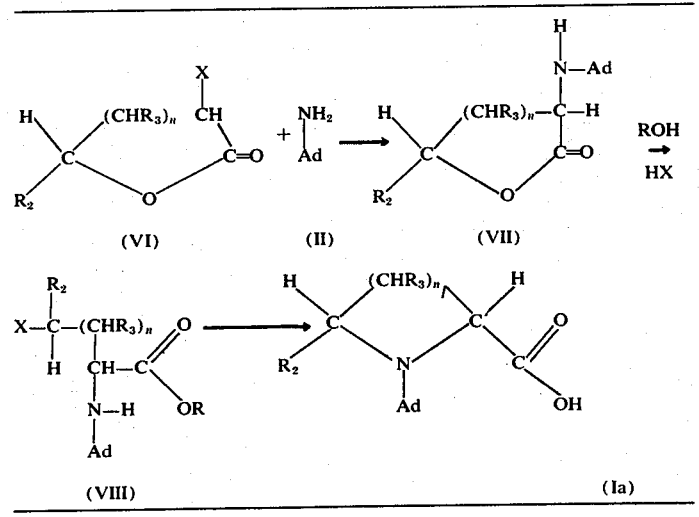

wherein Ad, $R_2$, $R_3$, n and X are as previously defined and R is lower alkyl.

In those instances when it is desired to prepare a 3-oxy-substituted composition one may prepare it by reacting adamantyl amine with an epi-α or epi-ω halohydrincarboxylate, cleaving the epoxide bond and then causing ring closure, thereby forming an appropriately substituted 3-hydroxy-1-(1-adamantyl)-carboxyazacyclic compound.

The following examples illustrate the preparation of compounds of this invention.

EXAMPLE 1

1-(1-Adamantyl)-2-Carbomethoxyazetidine

Add 101.1 g. of 1-aminoadamantane, 192 g. of 2,4-dibromomethylbutyrate and 124 g. of sodium bicarbonate to 1.8 liters of acetonitrile and reflux for 24 hours. Pour into 9 liters of saturated aqueous sodium chloride solution and extract with ether. Dry the organic extract with sodium sulfate, filter removing the solvents and distill the product at 131°–135°C (0.2mm). An analytical sample of the desired ether melts at 84.5°–86.0°C. The hydrochloride salt, prepared from the free base with ethereal hydrogen chloride, melts at 147°–147.5°C.

In a similar manner, by replacing for the 2,4-dibromomethylbutyrate reactant of Example 1 with equivalent quantities of:

3-ethyl-2,4-dibromomethylbutyrate,
3-hydroxy-4-methyl-2,4-dibromomethylbutyrate,
3-acetoxy-2,4-dibromomethylbutyrate,
3-propionyloxy-7-methyl-2,6-dibromoethylhexanoate, and
3-methoxy-5-methyl-2,5-dibromoethylpentanoate, one can prepare:

3-ethyl-1-(1-adamantyl)-2-carbomethoxyazetidine,
3-hydroxy-4-methyl-1-(1-adamantyl)-2-carbomethoxyazetidine,
3-acetoxy-1-(1-adamantyl)-2-carbomethoxyazetidine;
3-proprionyloxy-6-methyl-1-(1-adamantyl)-2-carboethoxypiperidine, and
3-methoxy-5-methyl-2-carboethoxypyrrolidine, respectively.

EXAMPLE 2

1-(1-Adamantyl)-2-Azetidinecarboxylic Acid

Reflux a mixture of 2.9 g. of 1-(1-adamantyl)-2-carbomethoxyazetidine and 3.2 g. of barium hydroxide (octahydrate) in 30 ml. of water for thirty-five minutes. Add 45 ml. of water and pass in carbon dioxide until the precipitation stops. Filter to remove the water obtaining the product of this example. An analytically pure sample, crystallized from chloroformhexane, melts at 172°–173.5°C.

EXAMPLE 3

1-(1-Adamantyl)-2-Carboethoxypyrrolidine

Add 25.0 g. of 1-aminoadamantane, 52.8 g. of 2,5-dibromo-ethylpentanoate and 3.1 g. of sodium bicarbonate to 450 ml. of acetonitrile and reflux for 24 hours. Pour into 2.5 liters water containing 10 g. of sodium hydroxide, saturate with sodium chloride and extract with ether. After drying over sodium sulfate, filtering and removing solvents, distill the product of this example at 112°–115°C. The hydrochloride salt, prepared from the free base with ethereal hydrogen chloride, melts at 187°–188.0°C.

EXAMPLE 4

1-(1-Adamantyl)-Proline

Reflux a mixture of 5.22 g. of 1-(1-adamantyl)-2-carboethoxypyrrolidine and 8.8 g. barium hydroxide (octahydrate) in 75 ml. of water for 2¾ hours. Following the procedure of Example 2, obtain the product of this example. An analytical sample, obtained by crystallization from dichloromethane-hexane, melts at 257°–261°C.

EXAMPLE 5

1-(1-Adamantyl)-2-Carboethoxypiperidine

Add 25.0 g. of 1-aminoadamantane, 55.2 g. of 2,6-dibromoethylhexanoate and 3.1 g. of sodium bicarbonate to 450 ml. of acetonitrile and carry out the reaction according to the procedure of Example 3. The product of this example distills at 126°–126.5°C (0.01 mm.). The hydrochloride salt, prepared from the free base with ethereal hydrogen chloride, melts at 184°–185.0°C.

EXAMPLE 6

1-(1-Adamantyl)-2-Pipecolic Acid

Hydrolyze 1-(1-adamantyl)-2-carboethoxypiperidine as in Example 4, refluxing for four days. Recrystallize from dichloromethane-hexane and obtain analytically pure product that melts with decomposition between 230°–260°C.

EXAMPLE 7

1-(1-Adamantyl)-2-Carboethoxyaziridine

Cool a solution of 100 g. of 2,3-dibromo-ethylpropionate in 390 ml. of benzene to 8°C and slowly add a mixture of 58 g. of 1-aminoadamantane and 78 g. of triethylamine maintaining the reaction temperature at 20°–25°C. After addition is complete, reflux for 3 hours and stir for 16 hours at room temperature. Filter and wash the precipitate with ether. Remove the ether and benzene from the filtrate and distill the product of this example at 140°–143°C (0.1 mm.).

Other representative compounds within the scope of this invention are:

4-isopropyl-1-(1-adamantyl)-2-carboxyazetidine;
4-acetoxy-6-methyl-1-(1-adamantyl)-1-aza-2-carboethoxycycloheptanoate;
5,6-dimethyl-1-(1-adamantyl)-1-aza-2-carboxycyclooctane;
6-methyl-4-propoxy-1-(1-adamantyl)-2-pipecolic acid;
4-isopropyl-8-methyl-6-propoxy-1-(1-adamantyl)-1-aza-2-carboxycyclooctane;
3-propionoxy-1-(1-adamantyl)-2-carboxypyrrolidine;
6-methyl-1-(1-adamantyl)-1-aza-2-carboxy-4-cyclohexene, and
1-(1-adamantyl)-1-aza-2-carboxy-4,6-cyclooctadiene.

Parkinsonism is degenerative disease of the nervous system. The disease is manifest by its free cardinal characteristics: involuntary tremors, rigidity, and akinesia. Extrapyramidal syndromes exhibited with this condition include gait and postural abnormalities, oculargyric crisis and profuse salivation.

Attempts at treating these symptoms have involved the use of such classes of drugs as for example, antihistamines (diphenhydramine) anticholinergics (atropine sulfate, trihexyphenidyl) and amphetamines (dextroamphetamine sulfate) with varying degrees of success. However, these drugs due to their inherent side effects have a somewhat limited degree of utility. For example, anticholinergics may precipitate acute glaucoma in certain individuals; antihistamines may cause drowsiness and amphetamines and similar C.N.S. stimulants are contraindicated in those patients also having cardiac conditions.

Recently the use of L-dopa and amantidine hydrochloride, a drug first used for its antiviral activity, has been introduced for treating symptoms of parkinsonism. These drugs, although promising require high dosages and exhibit debilitating side effects which severely limit their utility. It is the object of this invention to provide a new agent with an improved therapeutic index for treating the manifestations of the disease.

In tests in rats, the compositions of this invention exhibit desirable results at doses significantly lower than those doses of amantidine hydrochloride required to achieve a desired response and, concomitant with this lower dosage regimen is a marked decrease in the debilitating side effects which may accompany the administration of amantidine hydrochloride e.g. nervousness, insomnia, psychic reactions and ataxia.

Based upon standard laboratory tests and procedures, the effective dosage of the active ingredient of the compositions of this invention is considered to be within the range of from about 0.3 to 6 mg. per kg. of mammalian body weight per day. For the preferred compounds of this invention, i.e. those wherein $n$ is 1 or 3, the dosage range can be between about 0.6 to 3 mg. per kg. per day. The daily dosage is preferably administered in divided doses. The dosage administered will of course be dependent upon the age, weight, and progression of the disease in the recipient.

The compounds of this invention may be administered alone or combined with other medicaments. In any event, a suitable pharmaceutically acceptable carrier is generally employed. A carrier is selected according to the route of administration to be used as well as according to the physical properties of the compounds and standard pharmaceutical practice. The carrier should not react chemically with the compound to be administered. The preparations containing the active ingredients of this invention may be in the form of tablets, capsules, syrups, elixirs, suspensions, suppositories and the like.

In the formulations of pharmaceutical preparations there can be employed such pharmaceutically acceptable diluents as for example, water, gelatin, lactose, starches, magnesium stearate, talc, vegetable oils, gums and theobroma oil.

The following examples show typical tablet and capsule formulations incorporating the tangible embodiments of this invention. The formulations are merely illustrative and no limitation is intended.

Tablet Formulations

I. Formula and Method of Manufacture for 1-Adamantyl-2-Carboxy-Azetidine

| Coated Tablets: | mg. - core |
|---|---|
| 1-Adamantyl-2-Carboxyazetidine | 4 |
| Lactose, U.S.P. | 62 |
| Dicalcium Phosphate | 40 |
| Sodium Lauryl Sulfate | 10 |
| Polyvinylpyrrolidone | 10 |
| Water 50 ml./1000 cores | |
| Corn Starch | 20 |
| Dry | |
| Sodium Lauryl Sulfate | 2 |
| Magnesium Stearate | 2 |
| Tablet Weight | 150 |

Procedure

The 1-adamantyl-2-carboxyazetidine is mixed with the lactose, dicalcium phosphate, and sodium lauryl sulfate. The above mixture is screened through a No. 60 screen and granulated with an aqueous solution containing polyvinylpyrrolidone. Add additional water, if necessary to bring powders to a pasty mass. Add corn starch and continue mixing until uniform granules are formed. Pass through a No. 10 screen, tray and dry in oven at 100°C for 12 to 14 hours. Reduce dried granulation through a No. 16 screen, add sodium lauryl sulfate and magnesium sulfate, mix and compress into desired shape on a tablet machine.

Coating

The above cores are treated with a lacquer and dusted with talc to prevent moisture absorption. Sub-coat layers are added to round out the core. A sufficient number of lacquer coats are applied to make the core enteric. Additional sub-coats and smoothing coats are applied to completely round out and smooth the tablet. Color coats are applied until desired shade is obtained. After drying, the coated tablets are polished to give the tablets an even gloss.

| II. Capsule Formulations Formula: | mg./capsule |
|---|---|
| 1-Adamantyl-2-Carboxyazetidine | 4 |
| Sodium Lauryl Sulfate | 20 |
| Lactose | 150 |
| Magnesium Stearate | 76 |
| | 250 |

Procedure

Mix together 1-adamantyl-2-carboxyazetidine, sodium lauryl sulfate and lactose. Pass through a No. 80 screen. Add magnesium stearate, mix and encapsulate into the proper size two-piece gelatin capsule.

| III. Suppository Formula: | mg./2 gm. |
|---|---|
| 1-Adamantyl-2-Carboxyazetidine | 8 |
| Theobroma Oil, Pharm. Grade to make | 2 gms. |

Method of Preparation

Prepare a slurry of the 1-adamantyl-2-carboxyazetidine with a portion of the melted theobroma oil to bring the batch to final weight. Pour the melted mix, while maintaining uniformity, into appropriately prepared molds and allow to cool.

Numerous variations of the above compositions of matter and processes for the manufacture will be apparent to one skilled in the art within the spirit of the present invention.

I claim:

1. A process for treating symptoms of parkinsonism which comprises administering to a mammal suffering from parkinsonism a therapeutically effective quantity of a composition of matter having the structural formula:

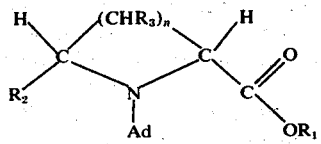

wherein Ad is 1-adamantyl; $R_1$ is hydrogen, lower alkyl or a pharmaceutically acceptable cation; $R_2$ is hydrogen or lower alkyl; $n$ is an integer from 0 to 5; each $R_3$ is hydrogen, and the pharmaceutically acceptable acid addition salt thereof.

2. A process according to claim 1 wherein $R_1$ and $R_2$ are each hydrogen.

3. A process according to claim 2 wherein $n$ is 1.

4. A process according to claim 2 wherein $n$ is 3.

5. A process according to claim 1 wherein $R_1$ is lower alkyl and $R_2$ is hydrogen.

6. A process according to claim 1 wherein $R_1$ is ethyl, $R_2$ is hydrogen and $n$ is 1.

7. A pharmaceutical composition for the treatment of symptoms of parkinsonism which comprises a therapeutically effective dose for the treatment of the symptoms of parkinsonism of a compound represented by the structural formula:

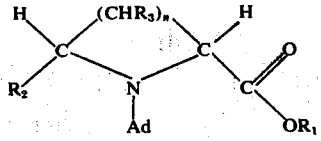

wherein Ad is 1-adamantyl; $R_1$ is hydrogen, lower alkyl or a pharmaceutically acceptable cation; $R_2$ is hydrogen or lower alkyl; $n$ is an integer from 0 to 5; each $R_3$ is hydrogen, and the pharmaceutically acceptable acid addition salt thereof; and a pharmaceutically acceptable carrier compatible with said compound.

8. A pharmaceutical composition according to claim 7 wherein $R_1$ and $R_2$ are each hydrogen.

9. A pharmaceutical composition according to claim 8 where $n$ is 1.

10. A pharmaceutical composition according to claim 8 wherein $n$ is 3.

11. A pharmaceutical composition according to claim 7 wherein $R_1$ is lower alkyl and $R_2$ is hydrogen.

12. A pharmaceutical composition according to claim 7 wherein $R_1$ is ethyl, $R_2$ is hydrogen and $n$ is 1.

* * * * *